E. S. ROBINSON.
TRANSMISSION GEARING.
APPLICATION FILED JUNE 3, 1913.

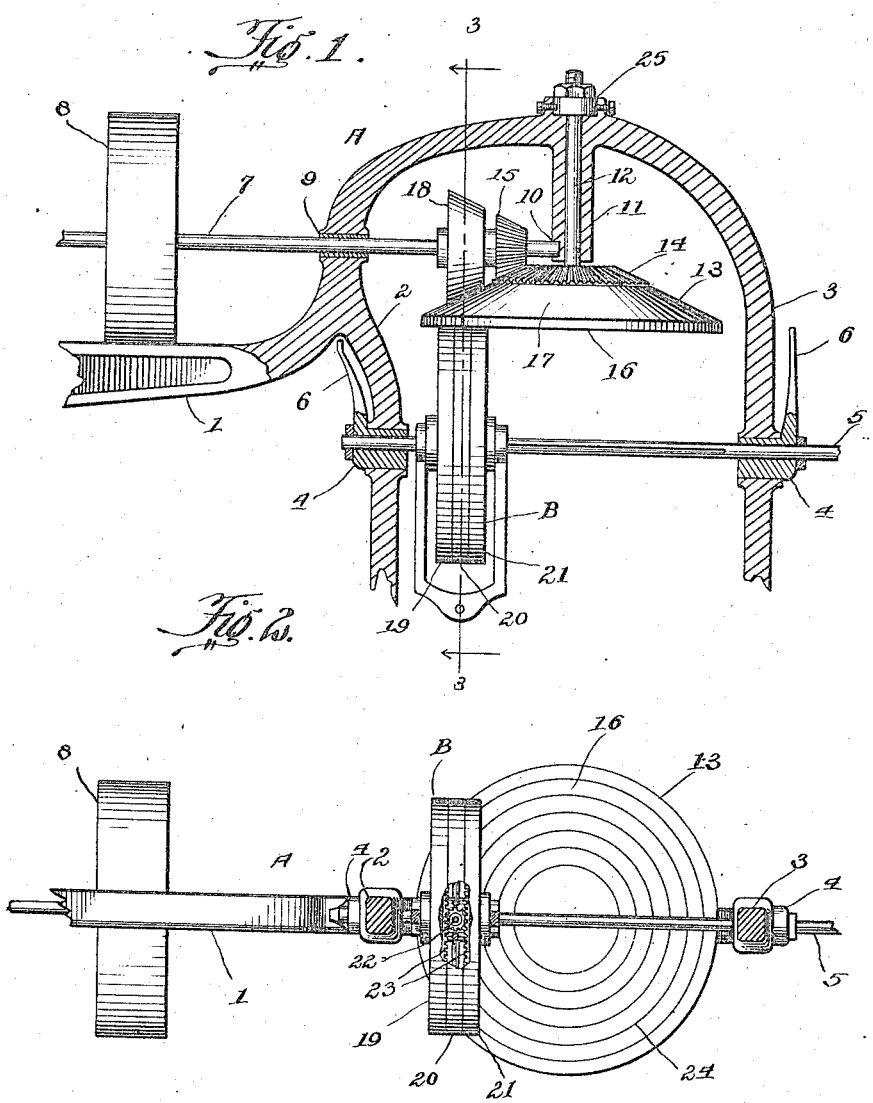

1,092,747.

Patented Apr. 7, 1914.
2 SHEETS—SHEET 2.

Inventor
E. S. Robinson.

Witnesses
Frederick L. Fox.
R. M. Smith,

By Victor J. Evans
Attorney

UNITED STATES PATENT OFFICE.

EDWARD S. ROBINSON, OF OROVILLE, CALIFORNIA, ASSIGNOR TO GOLDEN WEST MOTORS COMPANY, OF SACRAMENTO, CALIFORNIA, A CORPORATION OF CALIFORNIA.

TRANSMISSION-GEARING.

1,092,747.  Specification of Letters Patent.  Patented Apr. 7, 1914.

Application filed June 3, 1913. Serial No. 771,489.

*To all whom it may concern:*

Be it known that I, EDWARD S. ROBINSON, a citizen of the United States, residing at Oroville, in the county of Butte and State of California, have invented new and useful Improvements in Transmission-Gearing, of which the following is a specification.

This invention relates to transmission gearing and while the invention is particularly designed for use in connection with the driving mechanism of automobiles, motor trucks and other mechanically propelled vehicles, it will be seen as the description proceeds that the transmission gearing may be utilized in a number of places and relations which will readily suggest themselves.

The broad object of the invention is to provide a transmission gearing by means of which the relative speeds of rotation of a driving shaft and a driven shaft may be varied or changed in accordance with the required conditions.

A further object of the invention is to provide a variable speed transmission gearing of the friction type in which a friction wheel is driven by a friction disk, the friction wheel embodying a differential working face thereby admitting of the necessary width or degree of driving contact between the friction disk and the friction wheel.

A further object of the invention is to provide a novel construction of friction wheel of sectional form, the said wheel embodying a number of wheel-like sections cooperatively related so that the several sections are adapted to operate at different speeds in accordance with the path traveled by each section on the working face of the friction disk.

Another object of the invention is to provide an abutment wheel which backs up the friction disk in opposition to the friction wheel, to insure working and driving contact between the friction disk and wheel.

With the above and other objects in view, the invention consists in the novel construction, combination and arrangement of parts, as will hereinafter be more fully described, illustrated and claimed.

Figure 3:
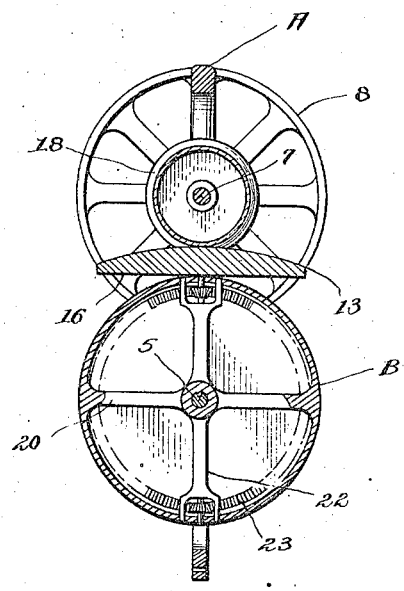
Figure 4:
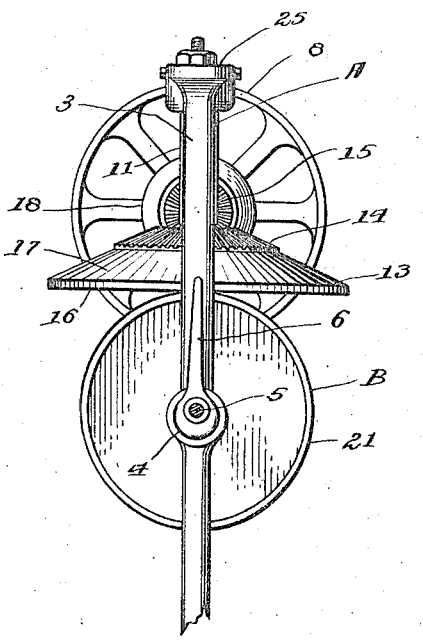

In the accompanying drawings: Figure 1 is a sectional view of the transmission gearing of this invention. Fig. 2 is a plan view of the same looking toward the under side of Fig. 1, the friction wheel being shown partly in section. Fig. 3 is a cross section on the line 3—3 of Fig. 1. Fig. 4 is an end elevation illustrating the eccentric mounting of the driven shaft and operating means for shifting said driven shaft.

The frame of the transmission gearing is designated generally by the reference character A, said frame being shown as supported by an arm 1, which, in automobile practice may extend to and connect with either the engine frame or the frame or chassis of the vehicle. The frame A is shown as comprising two arms 2 and 3 in which are mounted two oppositely arranged bearings 4. The driven shaft 5 is journaled in the bearings 4, the journal openings being eccentric of the peripheries of said bearings 4 so that when said bearings are turned the shaft will be shifted toward and away from the friction disk hereinafter described, to effect an engagement or disengagement between the friction disk and friction wheel, the latter being carried by the shaft 5. Each of the bearings 4 is shown as provided with an operating arm 6 which may be connected to any suitable manually controlled device for simultaneously turning both of the bearings 4 for the purpose stated.

The driving shaft indicated at 7 extends in a plane parallel to the driven shaft 5, the shaft 7 forming either the engine shaft or an extension of the engine shaft, 8 designating the fly-wheel of the engine. The shaft 7 is also journaled in the frame A at the point 9 and the extremity of said shaft is also journaled at the point 10 in a tubular bearing 11 forming an extension of the frame A as shown in Fig. 1.

Journaled in the tubular extension 11 is a countershaft 12 which is at right angles to the shafts 7 and 5. On one end of the shaft 12 is a friction disk 13 having a miter gear face 14 which meshes with and is driven by a miter gear 15 fast on the shaft 7. The working face 16 of the disk 13 is perfectly flat while the opposite or rear face thereof is beveled or conical as shown at 17 and in connection with the beveled face 17, I employ an abutment wheel 18 having a conical bearing face or periphery which works in contact with the face 17 of the friction disk and thereby backs up the disk in opposition to the friction wheel designated generally by the letter B and which works in driving contact with the opposite face 16 of said friction disk as shown in Fig. 1.

The frictional wheel B is of sectional construction and has a differential working face. In other words the friction wheel B is composed of a plurality of wheel-like sections 19, 20 and 21, the combined peripheries of said sections forming the working friction face of the wheel. All of the sections are mounted on the shaft 5 and therefore have a common axis of movement and the peripheries of all the said sections bear with equal pressure against the working face of the friction disk 16.

It will be observed that the middle section 20 of the friction wheel is cored out or recessed to permit one or more pinions 22 to be journaled therein on an axis radial to the shaft 5. The other sections 19 and 21 are provided on their inner adjacent sides with rack faces 23, the pinion or pinions 22 meshing with the rack faces 23 so that when one of the sections 19, 20 and 21 is moved at a different speed from one of the other sections, a differential and proportionately higher or lower speed will be imparted to each of the remaining sections.

Referring now to Fig. 2 wherein the working face 16 of the friction disk 13 has been divided up by imaginary concentric lines 24 into a plurality of working faces each of the same width as the periphery of one of the sections 19, 20 and 21 of the friction wheel, it will be readily understood that the outer section 19 of the wheel B will be driven at a greater rate of speed than the inner section 21. In other words the nearer the section of the wheel B to the center of the wheel 13, the slower the rate of speed at which said section is driven. Therefore a friction wheel having a single working face would cause a decided drag and wear between the contact faces of the disk and wheel which would absorb considerable power. By dividing up the face of the friction wheel and providing for the differential movement of the faces of the sections, such drag is overcome while at the same time retaining the full advantage derived from a wide working face or broad contact between the friction disk and the friction wheel. As stated the abutment wheel 18 backs up the disk 13 and insures driving contact between the wheels 13 and B.

25 designates an end thrust bearing for the countershaft 12, which insures the reduction of the friction of the shaft 12 to a minimum.

Any means such as a lever may be employed for shifting the friction wheel B longitudinally of the shaft 5 and across the face of the friction disk 13 for the purpose of varying the relative speeds of rotation of the driving shaft 7 and the driven shaft 5. Before shifting the wheel B across the face of the wheel 13, the bearings 4 are turned so as to relieve the driving contact between the wheels 13 and B. After the wheel B has been shifted to the desired extent across the working face of the friction disk, the wheel B may then be shifted back into driving contact with the wheel 13 by means of the eccentric bearings 4 as hereinabove explained.

What is claimed is:

1. Transmission gearing comprising a frame, a driving shaft, a driven shaft, a countershaft at a right angle to said driving and driven shafts, a friction wheel on the driven shaft, a friction driving disk on said countershaft having a flat side which works in contact with said friction wheel and a beveled side embodying a beveled gear face and a beveled abutment face surrounding said beveled gear face, a beveled pinion fast on said driving shaft and meshing with the beveled gear face of said friction driven disk, a rotary abutment loose on said driving shaft and working against the beveled abutment face of said friction driving disk, means on said driving shaft to prevent said rotary abutment from moving longitudinally of the last named shaft, and means for shifting said friction wheel across the flat side of the friction driving disk.

2. Transmission gearing comprising a frame, a driving shaft, a driven shaft, a countershaft at a right angle to said driving and driven shafts, a friction wheel on the driven shaft, a friction driving disk on said countershaft having a flat side which works in contact with said friction wheel and a beveled side embodying a beveled gear face and a beveled abutment face surrounding said beveled gear face, a beveled pinion fast on said driving shaft and meshing with the beveled gear face of said friction driven disk, a rotary abutment on said driving shaft working against the beveled abutment face of said friction driving disk, means for shifting said friction wheel across the flat side of the friction driving disk, an end thrust bearing for said countershaft, and a bearing sleeve for said countershaft formed by an extension of said frame, said sleeve having one end of the driving shaft supported thereby.

In testimony whereof I affix my signature in presence of two witnesses.

EDWARD S. ROBINSON.

Witnesses:
K. M. ROBINSON,
R. H. DUNN.

Copies of this patent may be obtained for five cents each, by addressing the "Commissioner of Patents, Washington, D. C."